United States Patent
Mieslinger

(10) Patent No.: US 8,777,112 B2
(45) Date of Patent: Jul. 15, 2014

(54) RFID GASKET STRUCTURE

(75) Inventor: Stefan Mieslinger, Essenbach (DE)

(73) Assignee: Tagstar Systems GmbH, Sauerlach (DE)

(*) Notice: Subject to any disclaimer, the term of this patent is extended or adjusted under 35 U.S.C. 154(b) by 0 days.

(21) Appl. No.: 13/233,743

(22) Filed: Sep. 15, 2011

(65) Prior Publication Data
US 2013/0068843 A1    Mar. 21, 2013

(51) Int. Cl.
*G06K 19/00* (2006.01)

(52) U.S. Cl.
USPC .................................. 235/492; 235/487

(58) Field of Classification Search
USPC ............... 235/487, 492; 340/10, 572
See application file for complete search history.

(56) References Cited

U.S. PATENT DOCUMENTS

| | | | |
|---|---|---|---|
| 7,068,170 B2 | 6/2006 | Green | 340/572.1 |
| 7,388,506 B2 | 6/2008 | Abbott | 340/572.8 |
| 7,969,308 B2 | 6/2011 | Cotton | 340/572.1 |
| 7,969,380 B2 | 6/2011 | Burke et al. | 343/872 |
| 2006/0049948 A1* | 3/2006 | Chen et al. | 340/572.7 |
| 2007/0057769 A1 | 3/2007 | Corbett, Jr. | |
| 2008/0173109 A1* | 7/2008 | Cogen et al. | 73/865.8 |
| 2008/0309495 A1 | 12/2008 | Chisholm | 340/572.7 |
| 2009/0289340 A1* | 11/2009 | Yamazaki et al. | 257/679 |
| 2010/0090012 A1 | 4/2010 | Moritz | 235/492 |

FOREIGN PATENT DOCUMENTS

WO    WO 2009090619 A1 *    7/2009
WO         2010082945            7/2010

OTHER PUBLICATIONS

"SAG RFID Disc Patch Tag—PVC—Direct Bonding / NFC Tags," 2 pages [retrieved on Sep. 21, 2011]. Retrieved from the internet <URL:http://www.alibaba.com/product-tp/215405060/SAG_RFID_Disc_Patch_Tag_PVC.html>.
"ABS RFID disk tag with center hole," 2 pages [retrieved on Sep. 21, 2011]. Retrieved from the internet <URL:http://www.alibaba.com/product-gs/429216264/ABS_RFID_disk_tag_with_center.html>.
"Customized Disc RFID Tags," 2 pages [retrieved on Sep. 21, 2011]. Retrieved from the internet <URL:http://www.alibaba.com/product-tp/109200886/Customized_Disc_RFID_Tags.html>.
"RFID Disk Tag 25mm," 2 pages [retrieved on Sep. 21, 2011]. Retrieved from the internet <URL:http://www.parallax.com/Store/Accessories/Hardware/tabid/162/ProductID/427/List/1/Default.aspx?SortField=ProductName,ProductName>.
"Clarity Tag Series," 1 page [retrieved on Sep. 21, 2011]. Retrieved from the Internet <URL://http://www.rfid-in-china.com/2008-08-20/products_detail_2026.html>.

(Continued)

*Primary Examiner* — Matthew Mikels
(74) *Attorney, Agent, or Firm* — Proskauer Rose LLP

(57) ABSTRACT

Described are RFID structures. An RFID structure includes a planar gasket layer with a tensile modulus value less than 5 Gpa. The gasket layer defines a perimeter including one or more guide indentations. The RFID structure also includes a loop antenna assembly positioned within the gasket layer. The loop antenna includes an antenna track, and at least two contact pads. The loop antenna assembly surrounds an area that can be more than at least 10% of a total area defined by an outer perimeter of the gasket layer. The RFID structure also includes an integrated circuit unit coupled to the at least two contact pads.

28 Claims, 6 Drawing Sheets

(56) References Cited

OTHER PUBLICATIONS

"RFID Clear Tag—08," 1 page [retrieved on Sep. 21, 2011]. Retrieved from the Internet <URL://http://www.rfid-in-china.com/2009-07-02/products_detail_2234.html>.

"RFID Clear Tag—09," 1 page [retrieved on Sep. 21, 2011]. Retrieved from the Internet <URL://http://www.rfid-in-china.com/2010-11-26/products_detail_2322.html>.

"RFID disc tag, RFID disk tag of professional factory," 3 pages. Retrieved from the Internet <URL:http://www.alibaba.com/product-gs/462246580/RFID_disc_tag_RFID_disk_tag.html>.

"RFID disc tag, adhesive rfid tag," 3 pages. Retrieved from the Internet <URL:http://www.alibaba.com/product-gs/225573853/Rfid_disc_tag_adhesive_rfid_tag.html>.

"RFID disc tags with 3m glue," 2 pages. Retrieved from the Internet <URL:http://www.alibaba.com/product-gs/432678047/rfid_disc_tags_with_3m_glue.html>.

"RFID PVC Disc Tag," 2 pages. Retrieved from the Internet <URL:http://www.alibaba.com/product-gs/275574734/RFID_PVC_Disc_Tag.html>.

International Search Report and Written Opinion from co-pending PCT patent application No. PCT/IB2012/002209, dated Mar. 4, 2013, 10 pages.

\* cited by examiner

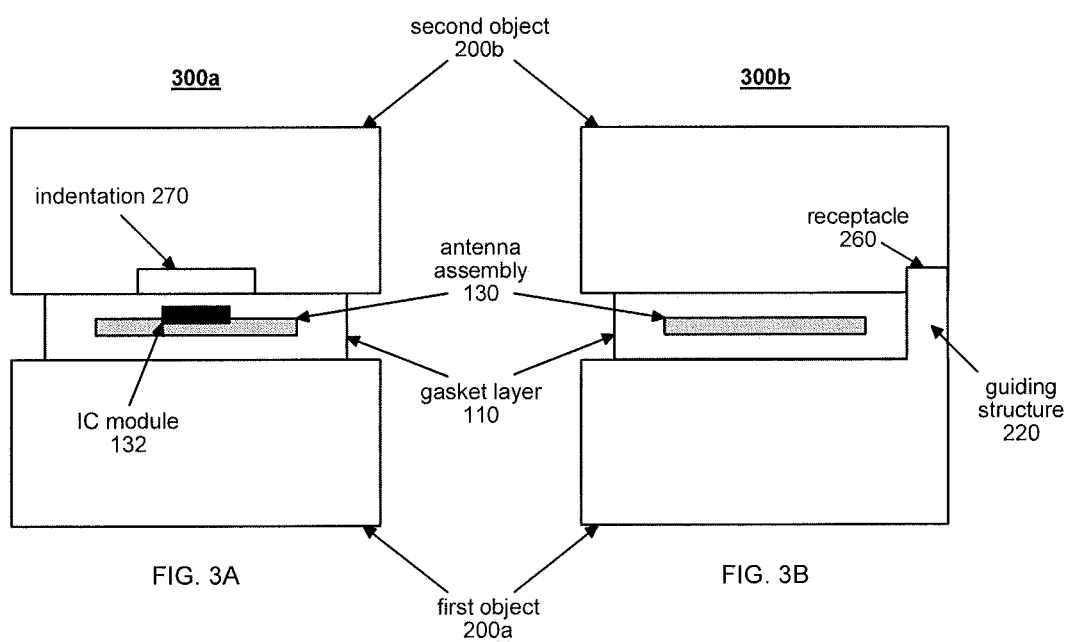

RFID GASKET STRUCTURE

FIELD OF THE INVENTION

The invention relates generally to RFID structures used as gaskets and methods for forming RFID gasket structures.

BACKGROUND OF THE INVENTION

Radio frequency identification (RFID) technology can be directed to wireless communication between one object, typically referred to as a RFID tag, and another object, typically referred to as a RFID reader/writer. RFID technology has been adopted, and can be increasingly being used, in virtually every industry, including, for example, manufacturing, transportation, retail, and waste management. RFID structures can include a resonance circuit with inductive coil(s), capacitative element(s) and/or integrated circuit (IC) module(s). In some applications, the IC module(s) can work as a memory device, a security device, an identification component, and/or as other application components.

In general, gaskets can include a wide variety of mechanical seals used, for example, to fill the space between two or more mating surfaces (e.g., matched machine parts or around pipe joints). In some embodiments, gaskets are used to prevent the escape and/or entry of a gas or fluid. Gasket materials can include a deformable material used to make a pressure-tight joint between stationary parts (e.g., between a cylinder head and a cylinder) that may require occasional separation.

SUMMARY OF THE INVENTION

In one aspect, there can be an RFID structure. The RFID structure includes a planar gasket layer with a tensile modulus value less than 5 GPa. The gasket layer defines a perimeter including one or more guide indentations. The RFID structure also includes a loop antenna assembly positioned within the gasket layer. The loop antenna includes an antenna track, and at least two contact pads. The loop antenna assembly surrounds an area that can be more than at least 10% of a total area defined by an outer perimeter of the gasket layer. The RFID structure also includes an integrated circuit unit coupled to the at least two contact pads.

In other examples, any of the aspects above can include one or more of the following features. The gasket layer can include an adhesive material on at least one or both of its surfaces. The adhesive material can be a permanent or removable adhesive. The gasket layer can include no adhesive material on any of its surfaces. The gasket layer can be at least as thick as the thickness of the integrated circuit. The perimeter with the one or more indentations can be the outer perimeter of the gasket layer. The gasket layer can be holeless. The gasket layer can define a hole within its surface area and the loop antenna assembly surrounds the hole. The perimeter with the one or more indentations can be an inner perimeter of the gasket layer surrounding the hole. The RFID structure can further include a first object including a first mating surface and defining a first hollow channel. The RFID structure can further include a second object including a second mating surface and defining a second hollow channel. The second mating surface can be parallel and adjacent to the first mating surface such that the first hollow channel can be aligned with the second hollow channel. The gasket layer can be positioned between the first and second mating surfaces such that the hole of the gasket layer couples the first and second channels. The first object can include one or more guiding structures and the second object can include one or more receptacles. The one or more guiding structures can extend beyond the plane defined by the second mating surface and can be aligned with the one or more receptacles. The one or more guide indentations of the gasket layer can be aligned with and adjacent to the one or more guiding structures. The first mating surface can include an indentation aligned with the integrated circuit unit. The indentation can include a depth with respect to first mating surface of at least the height of the integrated circuit unit.

In some embodiments the RFID structure further includes a first object including a mating surface defining a first hollow channel. The RFID structure can further include a second object including a closed mating surface. The closed mating surface can be parallel and adjacent to the mating surface. The gasket layer can be positioned between the mating surface and the closed surface. The first object can include one or more guiding structures and the second object can include one or more receptacles. The one or more guiding structures can extend beyond the plane defined by the second mating surface and can be aligned with the one or more receptacles. At least one of the one or more receptacles can be a hole. The one or more guide indentations of the gasket layer can be aligned with and adjacent to the one or more guiding structures.

In another aspect, there can be an RFID structure. The RFID structure includes a planar gasket layer including an inner perimeter that defines a hole. The RFID structure also includes a loop antenna assembly positioned within the gasket layer. The loop antenna includes an antenna track that surrounds the hole, and at least two contact pads. The loop antenna assembly surrounds an area that can be more than at least 10% of a total area defined by an outer perimeter of the gasket layer. The area of the hole can be at least 25% of the area surrounded by the loop antenna assembly. The RFID structure also includes an integrated circuit unit coupled to the at least two contact pads.

In other examples, any of the aspects above can include one or more of the following features. The gasket layer can include an adhesive material on at least one or both of its surfaces. The adhesive material can be a permanent or removable adhesive. The gasket layer can include no adhesive material on any of its surfaces The gasket layer can be at least as thick as the thickness of the integrated circuit. The planar gasket layer can have a tensile modulus value less than 5 GPa. The planar gasket layer can define a perimeter including one or more guide indentations. The perimeter with the one or more indentations can be the outer perimeter of the gasket layer. The perimeter with the one or more indentations can be an inner perimeter of the gasket layer surrounding the hole.

In some embodiments, the RFID structure further includes a first object including a first mating surface and defining a first hollow channel. The RFID structure can further include a second object including a second mating surface and defining a second hollow channel. The second mating surface can be parallel and adjacent to the first mating surface such that the first hollow channel can be aligned with the second hollow channel. The gasket layer can be positioned between the first and second mating surfaces such that the hole of the gasket layer couples the first and second channels. The first object can include one or more guiding structures and the second object can include one or more receptacles. The one or more guiding structures can extend beyond the plane defined by the second mating surface and can be aligned with the one or more receptacles. At least one of the one or more receptacles can be a hole. The one or more guide indentations of the gasket layer can be aligned with and adjacent to the one or more guiding structures. The first mating surface can include an indentation aligned with the integrated circuit unit. The indentation can include a depth with respect to first mating surface of at least the height of the integrated circuit unit.

The details of one or more examples are set forth in the accompanying drawings and the description below. Further features, aspects, and advantages of the invention will become apparent from the description, the drawings, and the claims. The drawings are not necessarily to scale, emphasis instead generally being placed upon illustrating the principles of the invention.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

FIGS. 3A-3B are cross-sectional side-views of gasket RFID structures.

DETAILED DESCRIPTION

Figure 1:
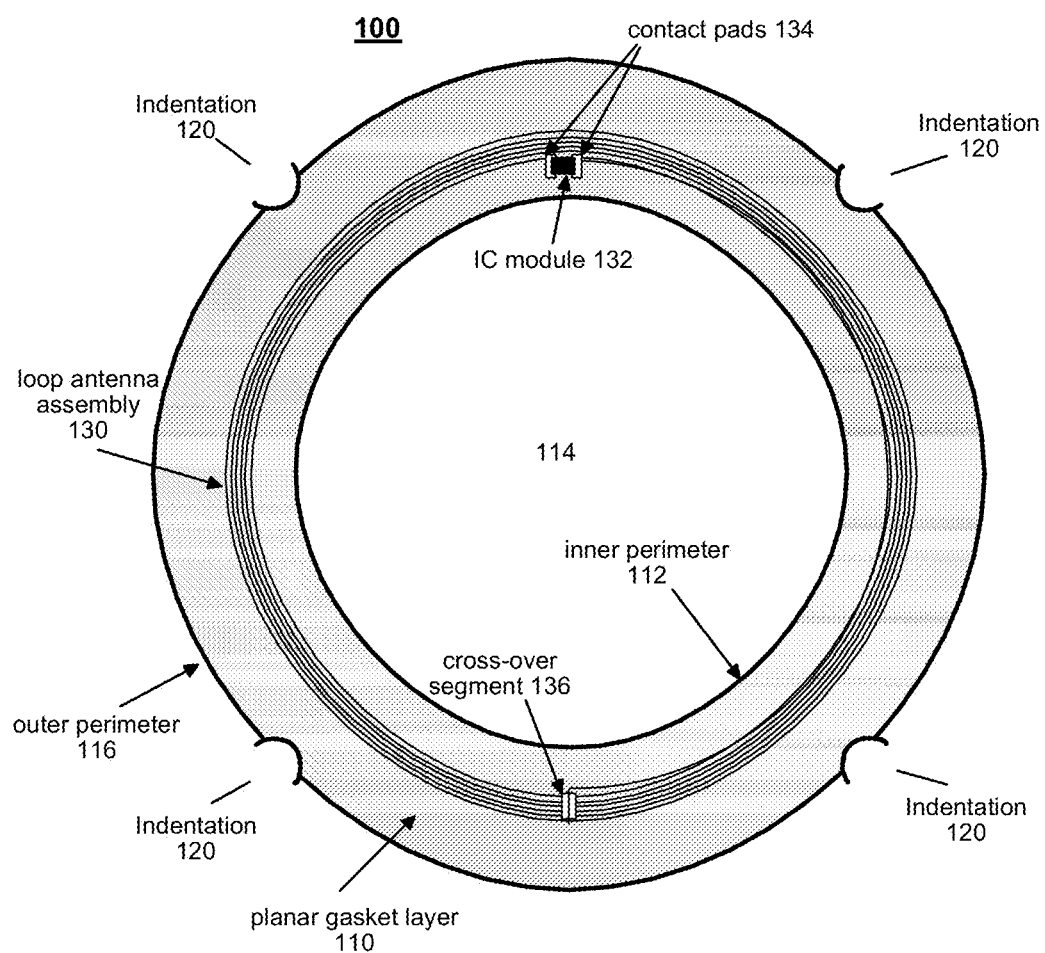
FIG. 1 is a top-view of a RFID structure.

In one aspect of the invention, an RFID structure can be combined with a gasket structure. FIG. 1 illustrates an example of an RFID gasket structure 100. RFID gasket structure 100 includes a planar gasket layer 110 that includes an inner perimeter 112 defining a hole 114, and an outer perimeter 116 defining indentations 120. Positioned within planar gasket layer 110 can be a loop antenna assembly 130 that includes an IC module 132 coupled to contact pads 134, one or more antenna tracks that loop around hole 114, and a cross-over segment 136 that includes an electronic connection that connects an inner portion of the antenna tracks with an outer portion of the antenna tracks. In alternative or supplemental embodiments, one or more indentations are defined on the inner perimeter of the gasket layer.

Figure 2A:
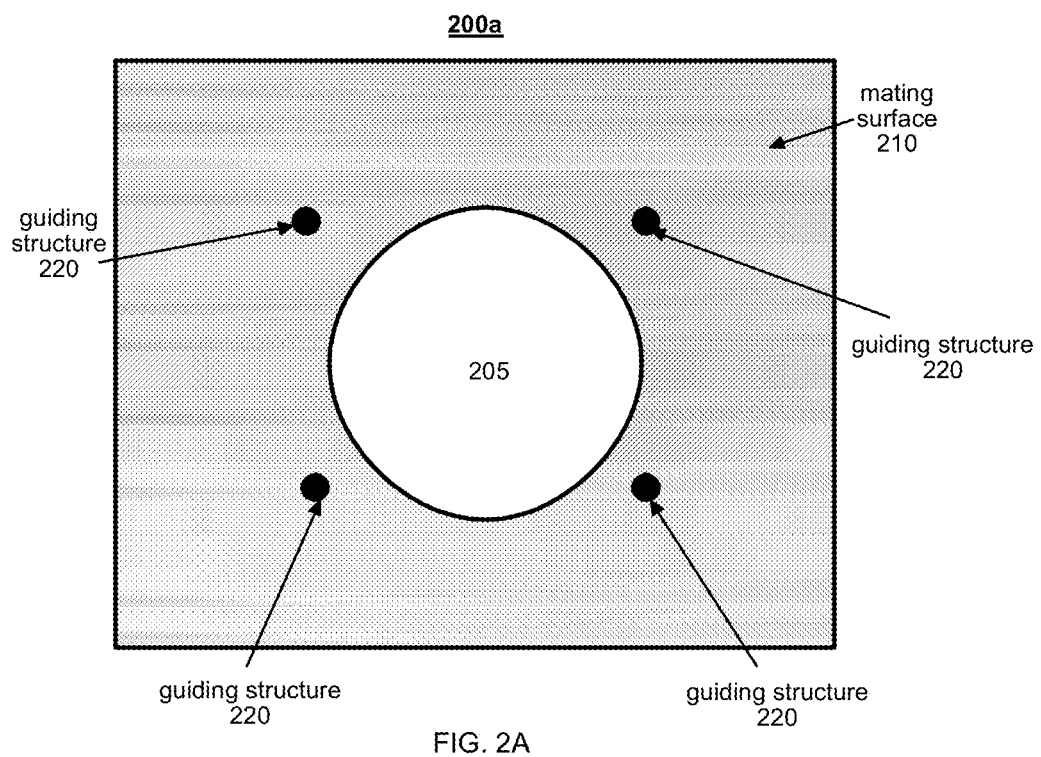
FIGS. 2A-2B are top-views of objects sealable by a gasket layer.
Figure 2B:
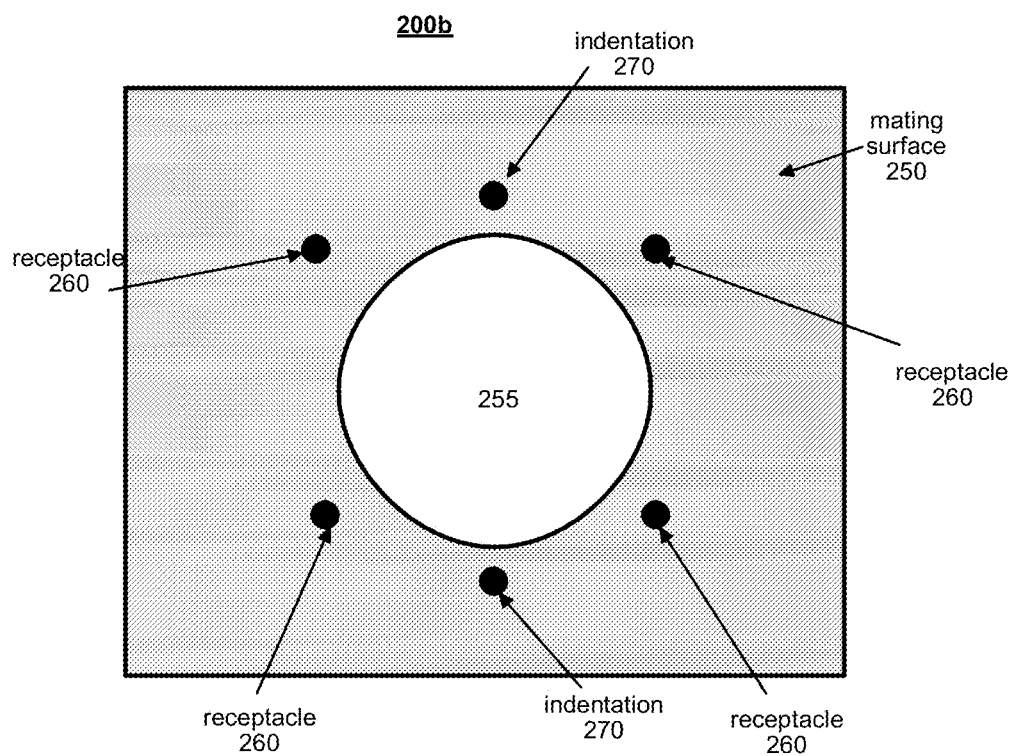

FIGS. 2A-2B illustrate first and second objects that the RFID structure 100 of FIG. 1 can be positioned between as a gasket structure. FIG. 2A illustrates a first object 200a including a first mating surface 210 that defines a first hollow channel 205 and includes guiding structures 220. Guiding structures 220 can extend beyond the plane defined by mating surface 210 and are aligned with the guide indentations 120 of the gasket layer 110 of FIG. 1.

FIG. 2B illustrates a second object 200b including a second mating surface 250 that defines a second hollow channel 255 and includes receptacles 260. In some embodiments, one or more of the receptacles 260 can be holes. Receptacles 260 are aligned with guide indentations 120 of the gasket layer 110 of FIG. 1 and the guiding structures 220 of FIG. 2A. The second object 200b can also include one or more indentations 270 aligned with IC module 132 and/or the cross-over segment 136.

In some embodiments, the mating surfaces 210 and 250 of the first or second objects 200a-b can include any combination of guiding structures 220 and receptacles 260. For example, a first mating surface can include both guiding structures and receptacles, while a second mating surface paired with the first mating surface includes receptacles aligned to the guiding structures of the first mating surface and guiding structures aligned to the receptacles of the first mating surface.

In alternative or supplemental embodiments, either the mating surface 210 of the first object 200a or the mating surface 250 of the second object 200b can be closed. In this example, the closed mating surface can act as a cap to a pipe or other opening defined by the open mating surface.

FIGS. 3A-3B illustrate cross-sectional diagrams 300a and 300b of a gasket layer 110 positioned between a first object 200a and a second object 200b. FIG. 3A can be a cross-sectional diagram 300a along a position of IC module 132, which illustrates indentation 270 positioned over IC module 132. FIG. 3B can be a cross-sectional diagram 300b along a position of an indentation in gasket layer 110. The indentation can be aligned with guiding structure 220 of first object 200a, which can be positioned within a receptacle 260 of the second object 200b.

Figure 4A:
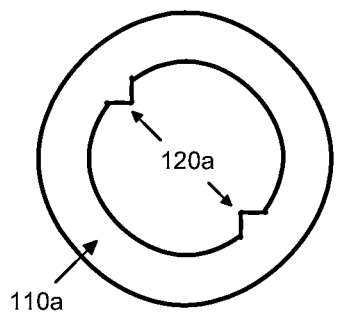
FIGS. 4A-4F are top-views of RFID gasket layers with different indentation configurations.
Figure 4B:
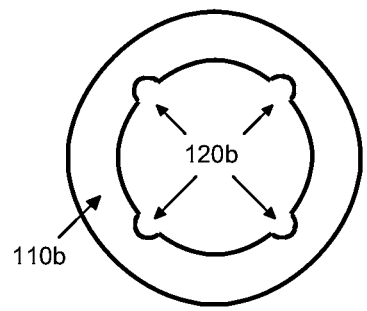
Figure 4C:
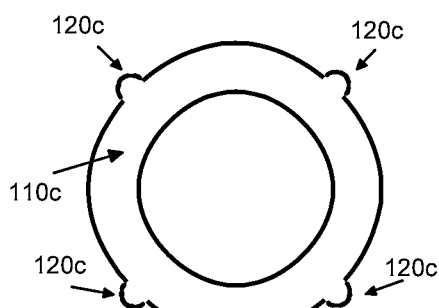
Figure 4D:
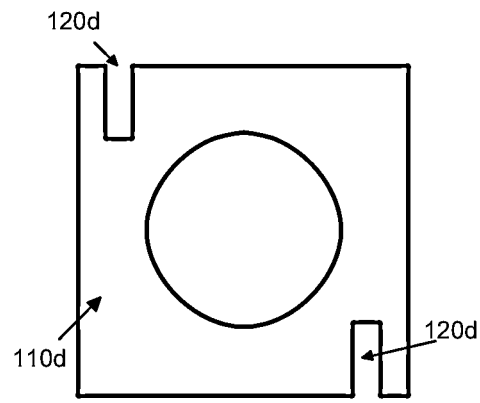
Figure 4E:
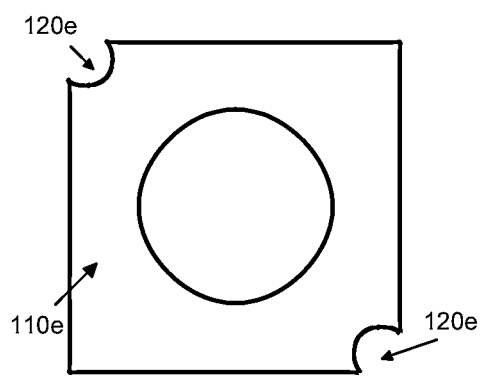
Figure 4F:
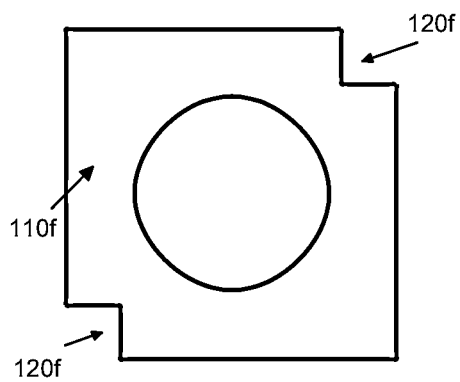

FIGS. 4A-4F are top-views of RFID gasket layers with different indentation configurations. FIG. 4A illustrates RFID gasket layer 100a, which defines protruding indentations 120a in the shape of square corners on an inner perimeter. FIG. 4B illustrates RFID gasket layer 100b, which defines indentation cutouts 120b in the shape of semicircles on an inner perimeter. FIG. 4C illustrates RFID gasket layer 100c, which defines protruding indentations 120c in the shape of semicircles on an outer perimeter. FIG. 4D illustrates RFID gasket layer 100d, which defines indentations 120d in the shape of square cutouts on an outer perimeter. FIG. 4E illustrates RFID gasket layer 100e, which defines indentations cutouts 120e in the shape of semicircles on an outer perimeter. FIG. 4F illustrates RFID gasket layer 100f, which defines indentations 120f in the shape of square cutouts on an outer perimeter. In general, a gasket layer can include any combination of protruding and/or cutout indentations defined on an inner perimeter, and outer perimeter, or both an inner and outer perimeter of the gasket layer. Each gasket layer 110a-110f includes an antenna assembly (not shown) and can be used with objects including guiding structures and/or receptacles corresponding to a respective indentation 120a-120f.

Figure 5A:
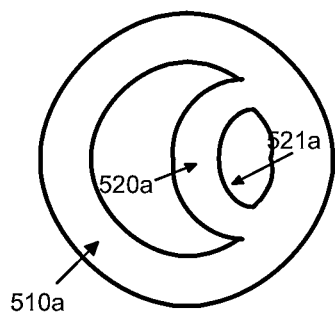
FIGS. 5A-5E are top-views of RFID gasket layers with different alignment configurations.
Figure 5B:
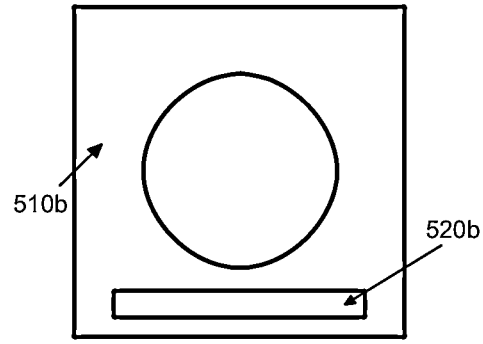
Figure 5C:
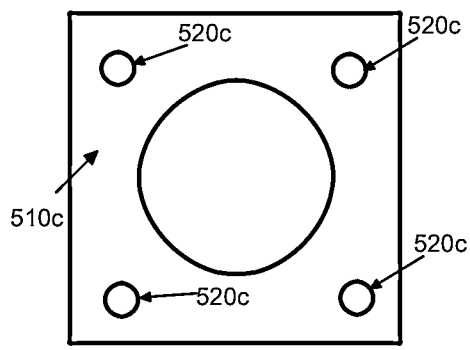
Figure 5D:
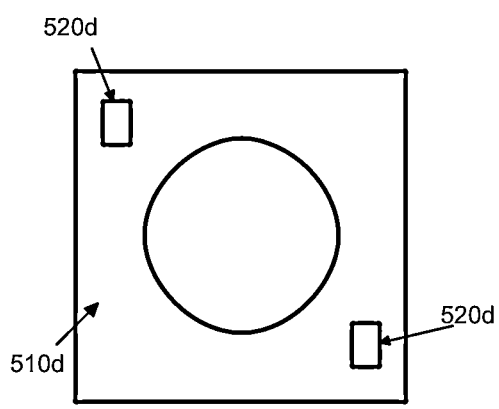
Figure 5E:
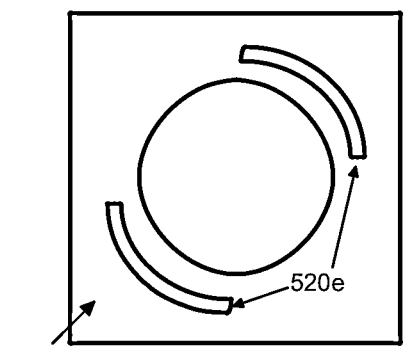

FIGS. 5A-5E are top-views of RFID gasket layers with different cutout configurations located within the inner and outer perimeters of the gasket layer. FIG. 5A illustrates RFID gasket layer 510a, which defines a cutout 521a. FIG. 5B illustrates RFID gasket layer 510b, which defines a cutout 520b in the shape of a rectangle. FIG. 5C illustrates RFID gasket layer 510c, which defines cutouts 520c in the shape of circles. FIG. 5D illustrates RFID gasket layer 510d, which defines cutouts 520d in the shape of squares. FIG. 5E illustrates RFID gasket layer 510e, which defines cutouts 520e in the shape of annular segments. In general, a gasket layer can include any combination of indentations defined on an inner perimeter and/or outer perimeter, or cutouts defined within the inner and outer perimeters. Each gasket layer 510a-510e includes an antenna assembly (not shown) and can be used with objects including guiding structures and/or receptacles corresponding to a respective cutout 521a, 520b-520e.

In some embodiments, gasket materials include sheet/foil/roll materials of natural and/or synthetic rubber (e.g., nitrile rubber), silicone, felt, neoprene, cork, polytetrafluoroethylene (PTFE), plastic (e.g., polychlorotrifluoroethylene), acrylates, epoxies, urethans, foam, fiber such as paper, plastic pastes, soft metallic materials (e.g., lead, copper), or any combination thereof. The gasket layer can be a construction (not shown) of one or more materials/foil (polymer and/or adhesive layers). In some embodiments, the gasket layer includes no adhesive materials. In these embodiments, the gasket layer (e.g., formed of a foil or other non-stick material) can be clamped between mating surfaces. The mating surfaces can also be fixed together with fasteners, such as screws. One example is the mating of cylinder bodies and cylinder heads.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention can be thus indicated by the appended claims, rather than by the foregoing description, and all changes that come within the meaning and range of equivalency of the claims are therefore intended to be embraced therein.

What can be claimed:

1. A RFID structure comprising:
   a planar gasket layer with a tensile modulus value less than 5 GPa, the gasket layer defining a perimeter including one or more guide indentations;
   a loop antenna assembly positioned within the gasket layer, the loop antenna including an antenna track, and at least two contact pads, wherein the loop antenna assembly surrounds an area that is more than at least 10% of a total area defined by an outer perimeter of the gasket layer;
   an integrated circuit unit coupled to the at least two contact pads;
   a first object including a first mating surface and defining a first hollow channel; and
   a second object including a second mating surface and defining a second hollow channel, the second mating surface parallel and adjacent to the first mating surface such that the first hollow channel is aligned with the second hollow channel, wherein the gasket layer is positioned between the first and second mating surfaces such that a hole in the gasket layer couples the first and second channels.

2. The RFID structure of claim 1, wherein the gasket layer includes an adhesive material on at least one or both of the surfaces of the gasket layer.

3. The RFID structure of claim 2, wherein the adhesive material is a permanent adhesive.

4. The RFID structure of claim 1, wherein the gasket layer is at least as thick as the thickness of the integrated circuit.

5. The RFID structure of claim 1, wherein the perimeter with the one or more indentations is the outer perimeter of the gasket layer.

6. The RFID structure of claim 1, wherein the loop antenna assembly surrounds the hole of the gasket layer.

7. The RFID structure of claim 6, wherein the perimeter with the one or more indentations is an inner perimeter of the gasket layer surrounding the hole.

8. The RFID structure of claim 1, wherein the first object includes one or more guiding structures and the second object includes one or more receptacles, wherein the one or more guiding structures extend beyond the plane defined by the second mating surface and are aligned with the one or more receptacles, and wherein the one or more guide indentations of the gasket layer are aligned with and adjacent to the one or more guiding structures.

9. The RFID structure of claim 8, wherein at least one of the one or more receptacles is a hole.

10. The RFID structure of claim 1, wherein the first mating surface includes an indentation aligned with the integrated circuit unit, the indentation including a depth with respect to first mating surface of at least the height of the integrated circuit unit.

11. The RFID structure of claim 1 further comprising:
    a first object including a mating surface defining a first hollow channel; and
    a second object including a closed mating surface, the closed mating surface parallel and adjacent to the mating surface, wherein the gasket layer is positioned between the mating surface and the closed surface.

12. The RFID structure of claim 11, wherein the first object includes one or more guiding structures and the second object includes one or more receptacles, wherein the one or more guiding structures extend beyond the plane defined by the second mating surface and are aligned with the one or more receptacles, and wherein the one or more guide indentations of the gasket layer are aligned with and adjacent to the one or more guiding structures.

13. The RFID structure of claim 12, wherein at least one of the one or more receptacles is a hole.

14. A RFID structure comprising:
    a planar gasket layer including an inner perimeter that defines a hole;
    a loop antenna assembly positioned within the gasket layer, the loop antenna including an antenna track that surrounds the hole, and at least two contact pads, wherein the loop antenna assembly surrounds an area that is more than at least 10% of a total area defined by an outer perimeter of the gasket layer, and wherein the area of the hole is at least 25% of the area surrounded by the loop antenna assembly;
    an integrated circuit unit coupled to the at least two contact pads;
    a first object including a first mating surface and defining a first hollow channel; and
    a second object including a second mating surface and defining a second hollow channel, the second mating surface parallel and adjacent to the first mating surface such that the first hollow channel is aligned with the second hollow channel, wherein the gasket layer is positioned between the first and second mating surfaces such that the hole of the gasket layer couples the first and second channels.

15. The RFID structure of claim 14, wherein the gasket layer includes an adhesive material on at least one or both of the surfaces of the gasket layer.

16. The RFID structure of claim 15, wherein the adhesive material is a permanent adhesive.

17. The RFID structure of claim 14, wherein the gasket layer is at least as thick as the thickness of the integrated circuit.

18. The RFID structure of claim 14, wherein the gasket layer has a tensile modulus value less than 5 GPa.

19. The RFID structure of claim 18, wherein the gasket layer defines a perimeter including one or more guide indentations.

20. The RFID structure of claim 19, wherein the perimeter with the one or more indentations is the outer perimeter of the gasket layer.

21. The RFID structure of claim 19, wherein the perimeter with the one or more indentations is an inner perimeter of the gasket layer surrounding the hole.

22. The RFID structure of claim 14, wherein the first object includes one or more guiding structures and the second object includes one or more receptacles, wherein the one or more guiding structures extend beyond the plane defined by the second mating surface and are aligned with the one or more receptacles, and wherein the one or more guide indentations of the gasket layer are aligned with and adjacent to the one or more guiding structures.

23. The RFID structure of claim 22, wherein at least one of the one or more receptacles is a hole.

24. The RFID structure of claim 14, wherein the first mating surface includes an indentation aligned with the integrated circuit unit, the indentation including a depth with respect to first mating surface of at least the height of the integrated circuit unit.

25. The RFID structure of claim 2, wherein the adhesive material is a removable adhesive.

26. The RFID structure of claim 15, wherein the adhesive material is a removable adhesive.

27. A RFID structure comprising:
a planar gasket layer with a tensile modulus value less than 5 GPa, the gasket layer defining a perimeter including one or more guide indentations;
a loop antenna assembly positioned within the gasket layer, the loop antenna including an antenna track, and at least two contact pads, wherein the loop antenna assembly surrounds an area that is more than at least 10% of a total area defined by an outer perimeter of the gasket layer;
an integrated circuit unit coupled to the at least two contact pads;
a first object including a first mating surface and defining a first hollow channel; and
a second object including a second mating surface and defining a second hollow channel, the second mating surface parallel and adjacent to the first mating surface such that the first hollow channel is aligned with the second hollow channel, wherein the gasket layer is positioned between the first and second mating surfaces such that the hole of the gasket layer couples the first and second channels.

28. A RFID structure comprising:
a planar gasket layer including an inner perimeter that defines a hole;
a loop antenna assembly positioned within the gasket layer, the loop antenna including an antenna track that surrounds the hole, and at least two contact pads, wherein the loop antenna assembly surrounds an area that is more than at least 10% of a total area defined by an outer perimeter of the gasket layer, and wherein the area of the hole is at least 25% of the area surrounded by the loop antenna assembly;
an integrated circuit unit coupled to the at least two contact pads;
a first object including a first mating surface and defining a first hollow channel; and
a second object including a second mating surface and defining a second hollow channel, the second mating surface parallel and adjacent to the first mating surface such that the first hollow channel is aligned with the second hollow channel, wherein the gasket layer is positioned between the first and second mating surfaces such that the hole of the gasket layer couples the first and second channels.

* * * * *